United States Patent [19]

Kramer

[11] Patent Number: 5,015,029

[45] Date of Patent: May 14, 1991

[54] VEHICLE WITH INTEGRAL COVER

[76] Inventor: Jerry D. Kramer, 3880 The Ascent, Atlanta, Ga. 30319

[21] Appl. No.: 585,506

[22] Filed: Sep. 20, 1990

[51] Int. Cl.$^5$ ............................................. E04H 15/06
[52] U.S. Cl. ................................. 296/180.1; 296/136; 135/88
[58] Field of Search ............... 296/180.1, 136; 135/88; 160/370.2, DIG. 3

[56] References Cited

U.S. PATENT DOCUMENTS

| | | | |
|---|---|---|---|
| 2,598,940 | 6/1952 | Robie | 135/88 X |
| 2,858,837 | 11/1958 | Harper | 135/88 X |
| 3,050,075 | 8/1962 | Kaplan et al. | 296/136 X |
| 3,492,043 | 1/1970 | Porsche . | |
| 4,088,363 | 5/1978 | Palmer . | |
| 4,091,484 | 5/1978 | Means . | |
| 4,474,401 | 10/1984 | Amick | 296/180.1 |
| 4,519,644 | 5/1985 | Song . | |
| 4,684,165 | 8/1987 | Becker . | |
| 4,746,163 | 5/1988 | Muscat . | |
| 4,767,147 | 8/1988 | Kobayakawa et al. | 296/180.1 |
| 4,825,889 | 5/1989 | Monteith . | |
| 4,944,321 | 7/1990 | Moyet-Ortiz | 296/136 X |

FOREIGN PATENT DOCUMENTS

| | | | |
|---|---|---|---|
| 2614898 | 10/1977 | Fed. Rep. of Germany | 296/136 |
| 3816475 | 11/1989 | Fed. Rep. of Germany | 296/136 |
| 101224 | 4/1989 | Japan | 296/136 |

Primary Examiner—Margaret A. Focarino
Assistant Examiner—Joseph D. Pape
Attorney, Agent, or Firm—Fleit, Jacobson, Cohn, Price, Holman & Stern

[57] ABSTRACT

A hollow, inverted U-shaped housing assembly is provided and the lower ends of the legs thereof are mounted from lower marginal portions of opposite longitudinal sides and in certain installations, mounted to the roof or top of a passenger vehicle body. Guide tracks extend forwardly from the lower ends of the housing legs and the interior of the housing is divided into a forwardly opening forward compartment and a rearwardly opening rear compartment. Front and rear sets of inverted U-shaped support bows are mounted within the front and rear compartments and have elongated front and rear cover portions supported therefrom. The front bows include followers guidingly engaged with the tracks for movement there along and from which the lower ends of the bows are pivotally mounted. Thus, the front bows may be forwardly displaced from the housing and forwardly and downwardly swung relative to the tracks for covering the front portion of the associated vehicle. The lower ends of the rear bows are pivotally supported from the housing and may be swung rearwardly and downwardly for covering the rear portion of the associated vehicle. The forwardmost bow of the forward bows and the rearmost bow of the rear bows each include closure cap structures supported therefrom which close the corresponding compartments of the housing when the bows and the cover portions are in their fully retracted positions.

12 Claims, 2 Drawing Sheets

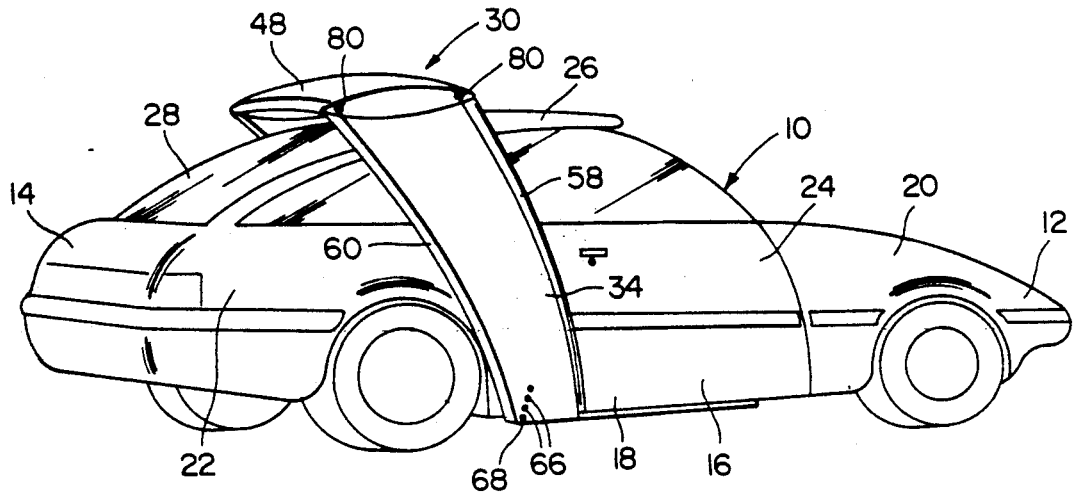
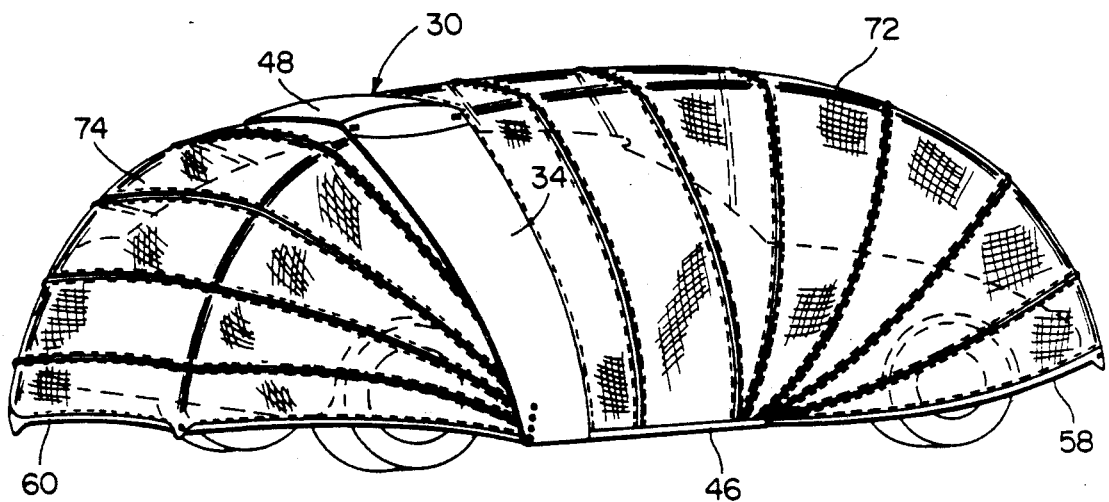
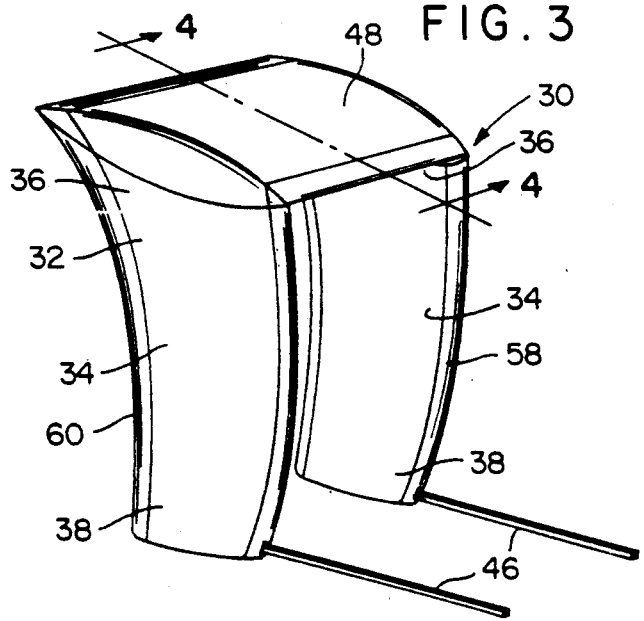
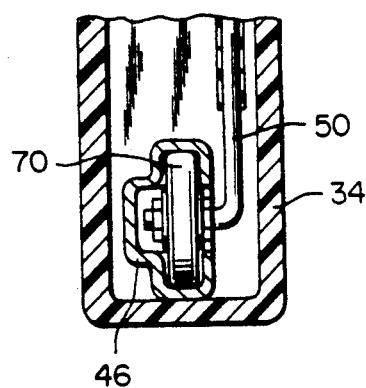

VEHICLE WITH INTEGRAL COVER

BACKGROUND OF THE INVENTION

1. FIELD OF THE INVENTION

This invention relates to a hollow, generally U-shaped housing arch supported from the lower margins of opposite sides of a passenger vehicle and in certain installations, mounted to the roof or top (preferably a two door sport coupe) and the housing opens both forwardly and rearwardly and supports in the front of the rear portions thereof front and rear sets of inverted U-shaped support bows for forward and rearward extension from the housing, each set of bows including a flexible cover portion supported therefrom by which the entire passenger vehicle may be covered when the bows are in their extended positions.

2. DESCRIPTION OF RELATED ART

Various different forms of covers for vehicles, both supported from and independent of the associated vehicles, heretofore have been provided. Examples of these previously known covers are disclosed in U.S. Pat. Nos. 3,492,043, 4,088,363, 4,019,484, 4,519,644, 4,684,165, 4,746,163 and 4,825,889. However, these previously known forms of covers do not include the refinements incorporated in the instant invention, nor are they as readily transported with and deployable over the associated vehicle.

SUMMARY OF THE INVENTION

Sporty coupe-type vehicles are becoming increasingly popular and are being manufactured to include increasing amounts of luxury accessories, performance capabilities and safety features as well as stylish appearances. As a result, manufacturing costs of these types of vehicles increase each year and the purchasers thereof, in turn, experience higher prices.

These increases in prices as well as the fact that some of these vehicles ultimately become collector items to the extent that they actually increase in value if well kept leads many purchasers to keep their vehicles covered when they are not actually being driven.

However, the most well known types of covers are merely form fitting covers that are stored in storage compartments of the vehicles, removed and placed over the vehicles at the end of each driving period. These types of covers are adequate, but time consuming each time the vehicle is parked and immediately before the vehicle is to be driven.

Although covers heretofore have been provided with storage compartments therefore mounted atop the associated vehicles and from which cover portions may be extended to cover the vehicles, these integral covers incorporate housings therefore which detract greatly from the appearance of the associated vehicles.

Accordingly, the main object of this invention is to provide a vehicle with an integral cover therefore which may be stored in an exterior storage compartment stylized in a manner adding to the appearance of the vehicle rather than detracting from the appearance of the vehicle.

Another object of this invention is to provide a vehicle with a cover therefore which may be quickly placed over the vehicle each time the vehicle is parked and shifted to a fully retracted position within the housing provided therefore each time it is desired to drive the vehicle.

A further object of this invention is to provide a vehicle with a cover therefore in accordance with the preceding objects and with the housing of the cover actually performing to increase the aerodynamics of the vehicle and also to shade at least the upper marginal portion of the rear window of a coupe-type vehicle from overhead sun.

An even further object of this invention is to provide a cover that is held above the vehicle surface so as to avoid damage by dirt, moisture and friction on the finish by covers that lay directly on the vehicle.

A final object of this invention to be specifically enumerated herein is to provide a vehicle and cover combination in accordance with the preceding objects and which will conform to conventional forms of manufacture, be of simple construction and easy to use so as to provide a device that will be economically feasible, long lasting and relatively trouble free in operation.

These together with other objects and advantages which become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a coupe-type vehicle with the cover assembly of the instant invention operatively mounted therefrom, the cover portions and support bows of the cover assembly being in fully retracted positions;

FIG. 2 is a perspective view similar to FIG. 1 but with the cover portions of the cover in fully extended positions;

FIG. 3 is a perspective view of the cover assembly;

FIG. 5 is an enlarged fragmentary vertical sectional view taken substantially upon the plane indicated by the section line 5—5 of FIG. 4.

DESCRIPTION OF THE PREFERRED EMBODIMENT

Figure 4:
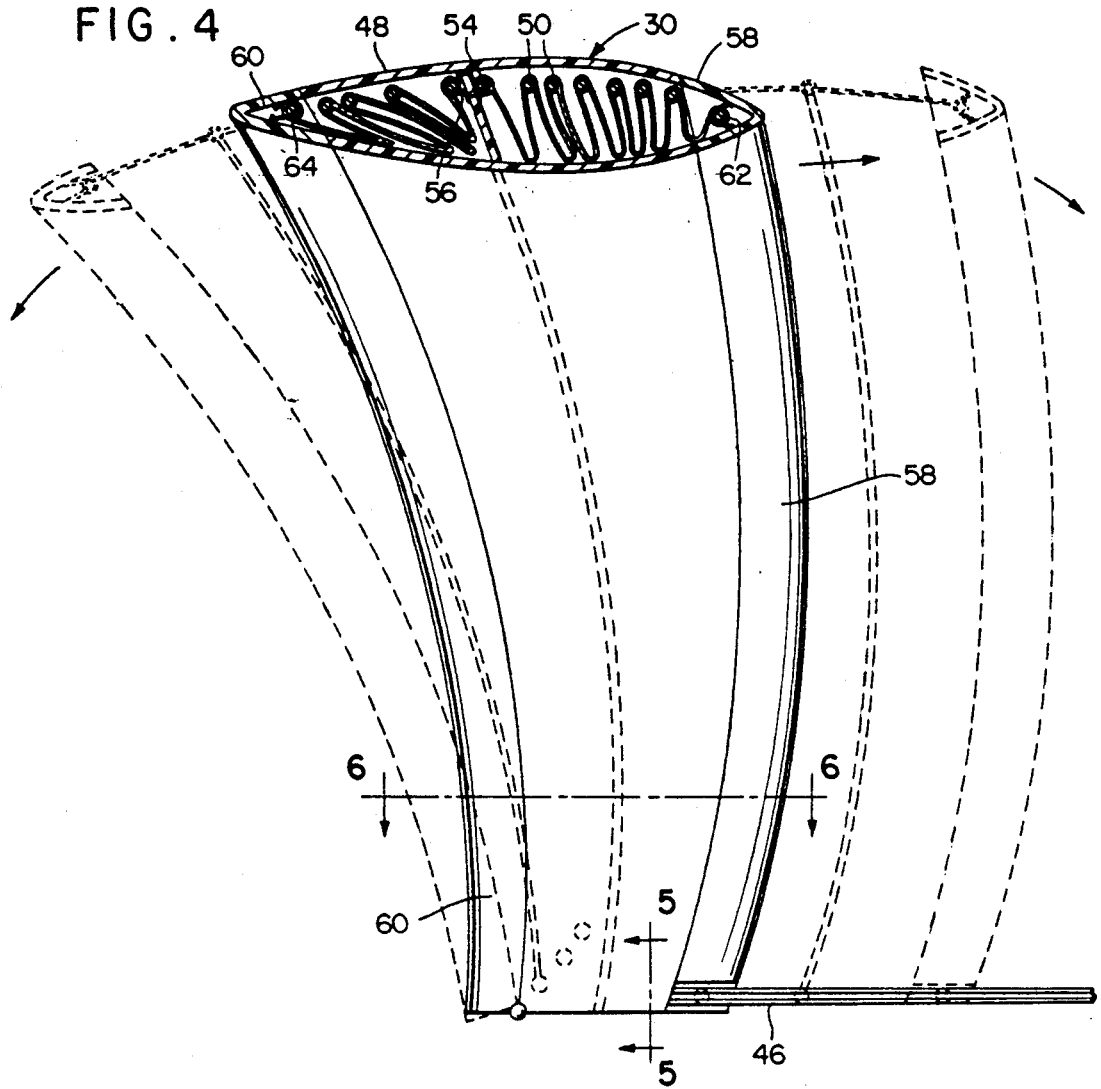
FIG. 4 is an enlarged fragmentary vertical sectional view taken substantially upon the plane indicated by the section line 4—4 of FIG. 3 and with partially extended portions of the cover illustrated in phantom lines.

Referring now more specifically to the drawings the numeral 10 generally designates a two door coupe-type vehicle including front and rear portions 12 and 14, opposite longitudinal sides 16 which extend between the front and rear portions 14 and include lower marginal portions 18. Vehicle 10 further includes front fenders 20 defining the forward portion 12, rear quarter panels 22 defining the rear portion 14 and opposite side doors 24 interposed between the front fenders 20 and the rear quarter panels 22. Further, the vehicle 10 includes a roof or top 26 extending between the opposite longitudinal sides 16 and a rear window or glass 28 extends downwardly from the rear portion of the roof 26 to the rear portion 14.

The cover of the instant invention is referred to in general by the referenced numeral 30 and includes an inverted, generally U-shaped and hollow housing arch assembly 32 including a pair of hollow upstanding legs 34 having upper and lower ends 36 and 38. The lower ends of the legs 34 are supported from the lower margins 18 of the longitudinal sides 16 in any convenient manner (not shown) anywhere rearward of the doors 24. The housing assembly opens forwardly and rearwardly and includes a center partition 40 dividing the interior of the housing assembly 32 into a generally inverted U-shaped forwardly opening compartment 42 and a generally U-shaped rearwardly opening compartment 44.

Formed as a portion of the housing assembly 32 of the cover 30 is a pair of front to rear extending guide tracks 46 which may be supported entirely from the housing assembly 32 or also supported from the lower margins 18 by any suitable means (not shown.)

The upper ends of the legs of the housing are interconnected by a hollow upper transverse portion 48 which also opens forwardly and rearwardly and through which the partition extends such that the compartments 42 and 44 also extend through the upper transverse portion 48. In addition, the upper transverse portion 48 is foil-shaped in longitudinal cross section, which general cross sectional shape is also joined by the legs 34.

The compartments 42 and 44 have sets of front and rear support bows 50 and 52 disposed therein which are shiftable relative thereto. In addition, the compartment 42 includes a stationary bow 54 and the rear compartment 44 includes a stationary bow 56.

The compartments 42 and 44 are closed by front and rear hollow caps 58 and 60, the cap 58 including a bow 62 therein and the cap 60 including a bow 64 therein. The lower ends of the bows 52 are pivotally supported from the housing assembly 32 as at 66 and the rear cap 60 is pivotally supported from the housing assembly 32 as at 68. The lower ends of the bows 50 have wheels 70 journaled therefrom guidingly engaged, as followers, with the guide track 46 and the lower end of the bow 62 also has similar wheels (not shown) journaled therefrom and guidingly engaged with the guide track 46. Accordingly, the support bows 50 and 62 are mounted from the guide tracks 46 for shifting there along and for pivoting relative thereto.

Front and rear flexible cover portions 72 and 74 are supported in any convenient manner from the bows 50, 54 and 62 and 52, 56 and 64 and are extendable and retractable with the bows 50 and 62 and the bows 52 and 64 with the front and rear covers 58 and 60.

Figure 6:
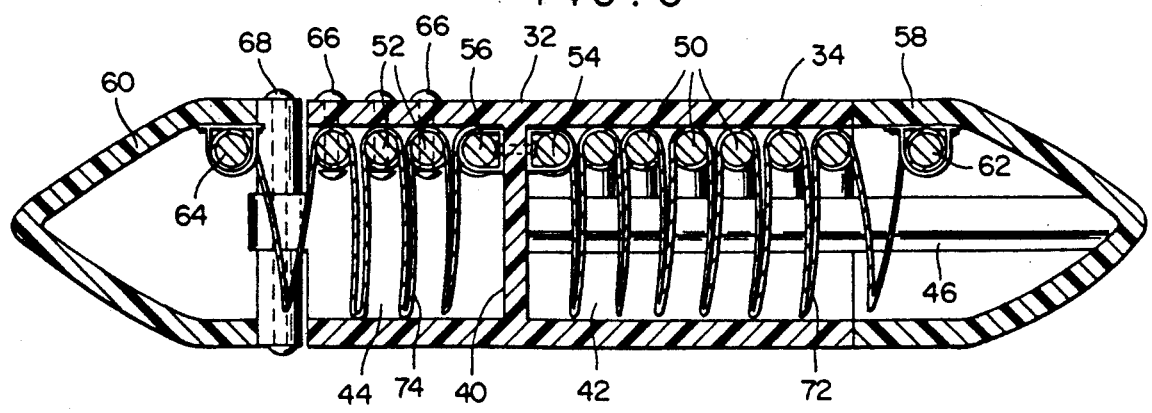
FIG. 6 is an enlarged horizontal sectional view taken substantially upon the plane indicated by the section line 6—6 of FIG. 4.

From FIGS. 4 and 6 of the drawings it may be seen that the front and rear covers 58 and 60 fully close the compartments 42 and 44 and are extendable relative thereto. FIG. 2 of the drawings illustrates the cover portions 72 and 74 in their fully extended positions, the attachment of the front and rear bows to the front and rear cover portions 72 and 74 automatically positioning the respective front and rear bows relative to the housing assembly 32 when the front and rear covers 58 and 60 are shifted and swung to the full extended positions thereof illustrated in FIG. 2.

The shape of the legs 34 of the housing assembly 32 may be modified, within limits, as desired and the forward angle of attack and shape of the upper transverse portion 48 may be varied within limits.

The upper transverse portion 48 not only serves to house the extendable and retractable portions of the cover, but also to smooth out and slightly downwardly deflect the air passing over the upper transverse portion 48. This serves to assist in maintaining the rear glass 28 free of rain and snow falling thereon and also to reduce the partial vacuum behind the vehicle 10 when the latter is traveling at high speed. Still further, the foil-shape of the legs 34 also serves to smooth out the air passing rearwardly immediately outward of the longitudinal sides 16 of the vehicle 10 and as will be noted from FIG. 1, the legs 34 are positioned immediately rearward of the doors 24 and forward of the forward extremities of the rear wheel fender wells.

Also, it will be noted from FIG. 1 of the drawings that any suitable form of latch structure 80 may be used to releaseably maintain the covers 58 and 60 in their closed positions. Further, the pivotal mounting of the rear support bows 52 and the rear cover 60 as at 60 and 68 may be hidden from the exteriors of the legs 34 if desired. Still further, the shape of the cover portions 72 and 74, as dictated by the bows 50 and 52, may be varied within limits, as desired.

The foregoing is considered as illustrative only of principles of the invention. Further, since numerous modifications and changes will readily occur to those skilled in the art, it is not desired to limit the invention to the exact construction and operation as shown and described, and, accordingly, all suitable modifications and equivalents may be resorted to, falling within the scope of the invention.

What is claimed as new is as follows:

1. In combination a vehicle including front and rear portions and opposite longitudinal sides extending between said front and rear portions and including lower marginal portions, and an inverted, generally U-shaped and hollow housing arch assembly including a pair of upstanding legs having upper and lower ends and an upper transverse portion extending between and interconnecting the upper ends of said legs, the lower ends of said legs being supported relative to generally longitudinal mid-portions of said lower marginal portions of said sides, said housing assembly including a forwardly opening forward portion and a rearwardly opening rear portion, front and rear sets of inverted U-shaped supports bows shiftably supported within said forward and rear portions of said housing arch assembly for movement between retracted positions recessed within said forward and rear portions of said housing arch assembly and extended positions with said forward support bows displaced forwardly out of said front portion and at least some of said front support bows swung forwardly and downwardly over said front portion of said vehicle and said rear support bows swung rearwardly and downwardly over said rear portion, elongated front and rear flexible cover portions of said housing arch assembly supported from said front and rear sets of bows and having rear and front ends, respectively, anchored in said front and rear portions and front and rear ends, anchored to a forwardmost and a rearmost bows, respectively, of said forward and rear sets of bows, said forwardmost and rearmost-bows including closure cap portions for removably closing the front and rear portions of said housing arch assembly.

2. The combination of claim 1 wherein said rear set of bows are pivotally supported relative to said housing arch assembly and said relative to set of bows are slidably and pivotally supported from said housing arch assembly.

3. The combination of claim 1 wherein said upper transverse portion is airfoil-shaped in cross section when said closure cap portions are in positions closing the forward and rear portions of said housing arch assembly.

4. The combination of claim 1 wherein said legs are forwardly bowed, said forwardmost and rearmost bows being similarly bowed when in the retracted positions thereof.

5. The combination of claim 1 wherein the lower ends of said legs include forwardly projecting guides extending forwardly along said lower marginal portions, the lower ends of said front set of bows including followers guidingly engaged with said guides for movement therealong and from which the lower ends of said front set of bows are pivotally supported.

6. The combination of claim 5 wherein said guides comprise elongated tracks and said followers comprise rollers journaled relative to the lower ends of said support bows slidably engaged in said tracks.

7. The combination of claim 1 wherein said hollow housing includes an interior center divider dividing the interior of said housing into front and rear forwardly and rearwardly open chambers in which said front and rear sets of support bows and the corresponding front and rear cover portions are received when said support bows are in their retracted positions.

8. The combination of claim 7 wherein said rear set of bows are pivotally supported relative to said housing arch assembly and said front set of bows are slidably and pivotally supported relative to said housing arch assembly.

9. The combination of claim 8 wherein said upper transverse portion is airfoil-shaped in cross section when said closure cap portions are in positions closing the forward and rear portions of said housing arch assembly.

10. The combination of claim 9 wherein said legs are forwardly bowed, said forwardmost and rearmost bows being similarly bowed when in the retracted positions thereof.

11. The combination of claim 10 wherein the lower ends of said legs include forwardly projecting guides extending forwardly along said lower marginal portions, the lower ends of said front set of bows including followers guidingly engaged with said guides for movement therealong and from which the lower ends of said front set of bows are pivotally supported.

12. The combination of claim 11 wherein said guides comprise elongated tracks and said followers comprise rollers journaled relative to the lower ends of said support bows slidably engaged in said tracks.

* * * * *